United States Patent
Heitele

(10) Patent No.: US 12,017,936 B2
(45) Date of Patent: Jun. 25, 2024

(54) MINERALIZATION CARTRIDGE AND METHOD FOR THE OPERATION THEREOF

(71) Applicant: AQUIS WASSER-LUFT-SYSTEME GMBH, LINDAU, Zweigniederlassung Rebstein, Rebstein (CH)

(72) Inventor: Bernd Heitele, Marbach (CH)

(73) Assignee: AQUIS Wasser-Luft-Systeme, GmbH, Lindau Zweigniederlassung Rebstein, Rebstein (CH)

( * ) Notice: Subject to any disclaimer, the term of this patent is extended or adjusted under 35 U.S.C. 154(b) by 377 days.

(21) Appl. No.: 17/439,778

(22) PCT Filed: Mar. 13, 2020

(86) PCT No.: PCT/EP2020/056865
§ 371 (c)(1),
(2) Date: Sep. 15, 2021

(87) PCT Pub. No.: WO2020/187745
PCT Pub. Date: Sep. 24, 2020

(65) Prior Publication Data
US 2022/0177336 A1 Jun. 9, 2022

(30) Foreign Application Priority Data

Mar. 15, 2019 (DE) .......................... 102019106690.5
Jul. 11, 2019 (DE) .......................... 102019118850.4

(51) Int. Cl.
*C02F 1/68* (2023.01)
*C02F 1/00* (2023.01)

(52) U.S. Cl.
CPC .............. *C02F 1/688* (2013.01); *C02F 1/003* (2013.01); *C02F 1/686* (2013.01); *C02F 2201/006* (2013.01); *C02F 2301/066* (2013.01)

(58) Field of Classification Search
CPC ........ B01D 37/025; C02F 1/003; C02F 1/006; C02F 1/283; C02F 1/42; C02F 1/441;
(Continued)

(56) References Cited

U.S. PATENT DOCUMENTS 6,553,894 B1    4/2003   Hamon et al.

FOREIGN PATENT DOCUMENTS

DE    10 2007 062 922 A1    7/2008
DE    10 2012 003 528 A1    10/2012
(Continued)

*Primary Examiner* — Dirk R Bass
(74) *Attorney, Agent, or Firm* — BRENEMAN & GEORGES

(57) ABSTRACT

The invention relates to a method for operating a water filter cartridge in a pipe, said water filter cartridge having a housing in the form of a pressure vessel, and an inlet and an outlet for water, characterized in that a main flow of water to which minerals are added is conducted through a main pipe inside the pressure vessel, and a dosing flow of concentrated salt solution is conducted through a dosing pipe, wherein the dosing pipe branches off from the main pipe and passes through a reservoir of constant volume and in which there is a concentrated salt solution consisting of sulphate salt, chloride salt and/or hydrogen carbonate salt, wherein the part of the dosing pipe extending from the reservoir leads into the main flow at a dosing point through a dosing opening with a constant flow cross-section, and wherein a resistance section which is situated upstream of the dosing point in the main flow is used to set the flow resistance in the main flow such that a pressure difference results between the main flow and the dosing flow and causes a volumetric flow rate of the dosing flow of salt solution which is substantially proportional to the main flow, through the dosing opening into the main flow.

21 Claims, 10 Drawing Sheets

Figure 1:
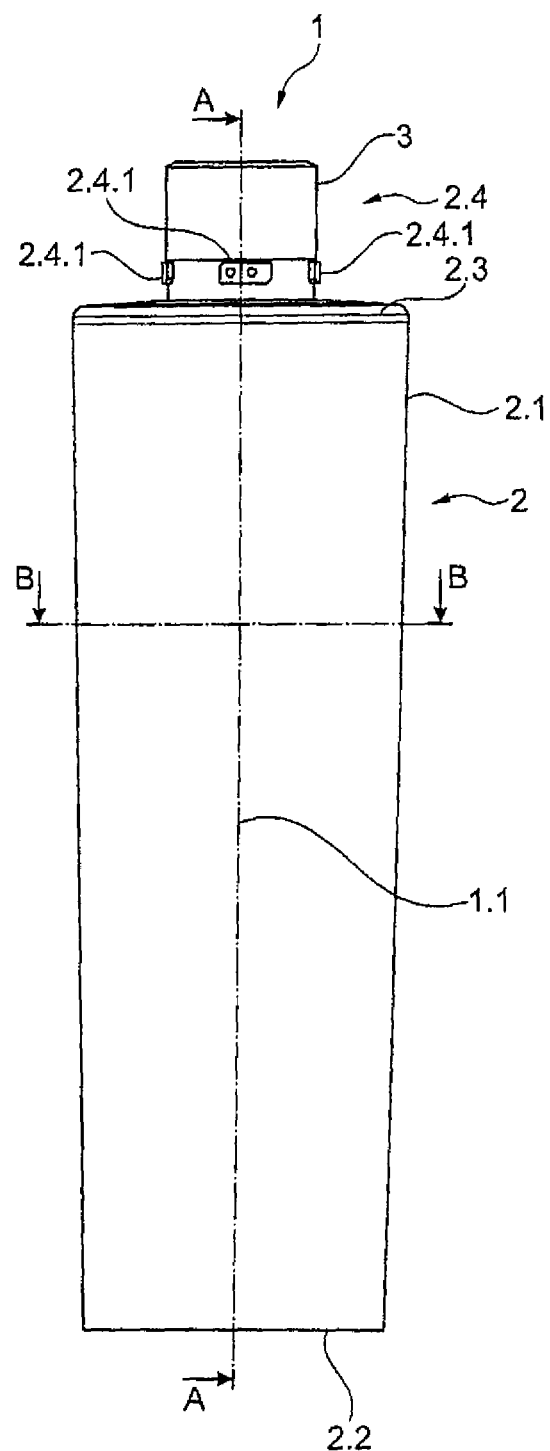

(58) Field of Classification Search
CPC .... C02F 1/686; C02F 1/688; C02F 2201/004; C02F 2201/006; C02F 2301/066; C02F 2307/06

See application file for complete search history.

(56) References Cited

FOREIGN PATENT DOCUMENTS

| | | |
|---|---|---|
| JP | 11319855 | 11/1999 |
| WO | WO 2012/163392 A2 | 12/2012 |
| WO | WO 2012/163392 A3 | 12/2012 |
| WO | WO 2013/053627 A1 | 4/2013 |
| WO | WO 2019/038622 A1 | 2/2019 |
| WO | WO 2020/187745 A1 | 9/2019 |

MINERALIZATION CARTRIDGE AND METHOD FOR THE OPERATION THEREOF

The invention relates to a method for operating a conduit-connected water filter cartridge for the mineralization of piped water and also to a conduit-connected water filter cartridge therefor, as claimed in claims 1 and 15.

PRIOR ART

Commercial conduit-connected filter cartridges for mineralization take essentially two forms. In one design, granular materials formed of $CaCo_3$ or $MgCo_3$, sometimes also with small proportions of MgO and Cao, are used for the mineralization. Such filters are for example connected in in the case of weakly mineralized waters with a high corrosion potential, in particular treated water from reverse osmosis systems. A small amount of $CaCO_3$ is dissolved thereby as a result of the free carbonic acid.

The pH is consequently raised and the corrosivity of the water is reduced. However, with such arrangements it is only possible to dissolve a few mg of Ca or Mg. The dissolution kinetics are also very low, meaning that after passing a few liters through rapidly there is hardly any significant mineralization. Such filters therefore consistently require relatively long down times or can only treat very small volume flows.

Other commercial mineralization filters operate using ion exchangers. These are used in order to release certain desired minerals into the water to be treated in a specific manner.

Although these filters are also sold as mineralization filters, strictly speaking these filters are not mineralization filters since, by way of example, calcium present in the piped water is exchanged for magnesium by ion exchange. The overall mineral content, in eq./l, of the output water remains constant in this case.

Weakly mineralized waters are, however, only suitable to a limited extent as thirst-quenching drinks during sporting activity, as salts lost through sweat are not replaced by them.

In terms of taste, weakly mineralized waters are easy to distinguish from well mineralized waters, since weakly mineralized waters leave behind a bitter note when going down the throat. A mineralization perceived as pleasant is achieved starting from around a conductivity of the drinking water of 200 µS/cm. Starting from a mineralization with conductivities of greater than 1500 µS/cm, however, the high mineral content can be tasted and the water is perceived as salty. The taste then also depends on the specific composition.

In order to ingest necessary minerals, in particular during sporting activity, practice to date has frequently been to add mineral tablets to the drinking water. These tablets consist predominantly of citrates of magnesium, of calcium or of potassium.

Problem and Solution

The problem addressed by the present invention is now to propose an alternative option for the mineralization of water, in particular of drinking water, by means of which large volume flows of water can be mineralized with a uniformly stable degree of mineralization, even over a long period, such that the water thus treated enables good replacement of minerals lost through sweat during sporting activity, while simultaneously providing a degree of mineralization that is perceived as pleasant.

The problem is solved by the features of claims 1 and 15. Advantageous and expedient developments are specified in the dependent claims.

Accordingly, the invention relates in a first aspect to a method for operating a conduit-connected water filter cartridge having a housing in the form of a pressure vessel having an inlet and having an outlet for water. This method is characterized in that inside the pressure vessel a main flow of water, to which minerals are added, is conducted through a main conduit and a dosing flow of concentrated salt solution is conducted through a dosing conduit, wherein the dosing conduit branches off from the main conduit and leads through a storage vessel of constant volume which contains a concentrated salt solution formed of sulfate salt, chloride salt and/or hydrogencarbonate salt, wherein the part of the dosing conduit departing from the storage vessel opens into the main flow at a dosing point via a dosing opening having a constant flow cross section, and wherein the flow resistance in the main flow is set by means of a resistance section in the main flow, which is arranged upstream of the dosing point in the direction of flow, such that a differential pressure arises between the main flow and the dosing flow, this differential pressure bringing about a volume flow of the dosing flow of the salt solution, through the dosing opening that opens into the main flow, which is substantially proportional to the main flow.

Especially preferably, the storage vessel can contain a salt bed formed of sulfate salt, chloride salt and/or hydrogencarbonate salt and hence a storage volume of concentrated salt solution is formed downstream of the salt bed in the direction of flow.

Such a method makes possible a mineralization of practically mineral-free water (for example from reverse osmosis systems) or water with a normal mineralization level, such as piped water, by addition of desired minerals, for example magnesium. With the aid of the mineralization, drinking water can be produced having a conductivity of at least 200 µS/cm.

For the performance of such a method, for example, a simple-to-install and virtually maintenance-free conduit-connected filter cartridge for mineralization can be used.

Such a conduit-connected water filter cartridge can for example comprise a housing in the form of a pressure vessel, an inlet and an outlet for water. Inside the pressure vessel, at least one storage vessel or a brine store can be provided for storing, during operation of the water filter cartridge, at least one concentrated salt solution (also referred to as brine solution) formed of sulfate salts, chloride salts or hydrogencarbonate salts for increasing the conductance, or mineralizing, the water flowing through the water filter cartridge. A bed of a granular material can further be provided, placed upstream of a dosing point for the salt solution, also referred to as brine dosing point, in the direction of flow of a main flow of the water, this bed forming a resistance section in the main flow in a manner such that a differential pressure is formed thereby when there is a flow through the cartridge, this differential pressure bringing about a dosing flow of the brine which is substantially proportional to the main flow, wherein the dosing flow has a separate resistance section in the form of a resistance layer in the dosing flow, the feed of which projects into the upstream bed. The granular material and the resistance layer form the resistance section in the main flow and the resistance section in the dosing flow, respectively.

Alternatively or in addition, the dosing section or the dosing flow can also comprise a capillary. The latter can for example have an internal diameter in a range from approximately 0.1 to 0.5 mm. Preferably an internal diameter between 0.15 and 0.4 mm.

With all of these embodiments of dosing sections, the desired addition amount can be reliably set depending on the viscosity of the concentrated salt solution to be added, in particular substantially independently of the line pressure on the water filter cartridge. That is to say, the dosing/the dosing ratio remains quite stable even in the event of pressure fluctuations.

Further details concerning such a filter cartridge shall be described in more detail hereinafter.

With the water filter cartridge in the operational orientation, with the outlet directed upwards, the main flow coming from the inlet can, according to a first embodiment, be conducted from the top to the resistance section so that it flows through the resistance section from top to bottom. The water flow in this case is divided in the feed and the pressure principle is utilized as a driving force for the dosing.

According to another embodiment, again with the water filter cartridge in the operational orientation, with the outlet directed upwards, the main flow coming from the inlet can be conducted to the underside of the resistance section so that it flows through the resistance section from bottom to top. This design operates on the basis of a suction principle.

Air is removed from this system significantly better and quicker compared to the first embodiment. In particular, when starting up, the air located between the salt grains in the salt vessel can escape very rapidly through the dosing pipe, since the resistance of the dosing pipe for air is small compared to the resistance for water.

The brine solution is dosed directly from the resistance pipe of the dosing section into the main flow of the water to be treated.

Pressure fluctuations occurring in the feed lead to movements in the amply dimensioned feed pipe for the water, which yet becomes brine when flowing through the vessel.

The brine dosing itself remains virtually constant as a result of the suction principle, even in the event of external pressure fluctuations. In the event of pressure fluctuations in the feed, as arise during the depressurization of the whole filter, for example when the water pressure upstream of the filter drops from 2 bar to 1 bar when a tap is opened, the enclosed air bubbles in the salt vessel expand. These air bubbles displace only little saturated brine towards the outlet via the dosing pipe which is filled with granular material and through which flow is difficult, whereas in contrast most brine flows back into the large downpipe and does not cause any increase in the salt load in the mineralized water.

It can preferably be provided in the method that at least one concentrated salt solution of sulfate salts, chloride salts or hydrogencarbonate salts is used, the solubility of these being at least 2 g/l at 20° C., preferably at least 50 g/l at 20° C.

I.e., the principle of the mineral dosing is based on a dosing of at least one concentrated salt solution, which is or are stored within a filter cartridge in at least one separate vessel.

The salt solution(s) in this case have a solubility of at least 2 g/l (e.g. $CaSO_4$), but generally greater than 50 g/l and less than 800 g/l. A preferred value for $CaCl_2$ or $MgCl_2$ is approximately 740 g/l. For $CaCl_2$ this is calculated based on the anhydrous form. In this concentration range the brine dosing functions reliably.

Preferably, the at least one brine solution can be dosed at a proportion by volume of 0.05% to 2% to the main flow.

For the mineralization of RO water (reverse osmosis water) having a conductivity of less than 50 $\rho S/cm$, for example for 2 mmol hardness (about 11.2° dH) in the filtrate approx. 0.8 ml of brine solution consisting of magnesium sulfate is required per liter of RO water. For the sodium hydrogencarbonate salt, for 4 mmol approx. 3.5 ml is required, which due to the valence likewise corresponds to approx. 11.2° dH. The conductivity of such a water is then around 600 µS/cm.

The dosing is effected by exploiting a differential pressure which is established when the flow flows through a resistance layer. The resistance layer used can be any granular materials, for example in the form of a bed. A granular material with a particle size of 0.1 mm to 2 mm can for example be used for the bed which in particular has a minimum extent of 1 cm in the direction of flow.

Ion exchangers, activated carbon or other particles (glass beads with an effective hydraulic particle size of approx. 0.1 to 2 mm can for example be considered for this purpose.

Example: if a volume flow of 1.0 l/min flows through a resistance layer with a particle size of 0.15 mm for a layer height of 70 mm and a throughflow diameter of 80 mm, a differential pressure across the height of the resistance layer of approx. 100 mbar forms (see also the Kozeny-Carman equation). However, the absolute magnitude of the resistance can be predicted only inexactly for different granular materials, since the resistance depends greatly both on the shape of the particles and on the degree of packing.

Therefore, in the proposed solution, preferably the same granular material is used for the resistance layer of the main flow and the resistance layer of the dosing flow.

The conductance of the water between the inlet and the outlet is preferably raised by at least 100 µS/cm to 2000 µS/cm, preferably by 600 µS/cm.

In order to achieve this, a dosing pipe projects into the resistance layer, this dosing pipe preferably being filled with the same granular material as in the resistance layer of the main flow. The dosing ratio of the dosing flow to the main flow can thus be adapted via the area ratios and the effective height of the resistance layer of the main flow and the effective height of the resistance layer of the dosing flow.

The following formula can be used: (cross-sectional area of the dosing pipe/effective height of the resistance layer of the dosing pipe)/(cross-sectional area of the main flow/effective height of the resistance layer of the main flow) gives the desired dosing ratio of brine concentrate to main flow (untreated, non-mineralized water)

$$\frac{A_{DR}}{H_{DR}} \bigg/ \frac{A_{HS}}{H_{HS}} = V_D$$

Example: A dosing ratio of 0.001 is intended to be achieved. I.e., 1 ml of concentrate per 1000 ml of water. With an 80 mm internal diameter of the filter (=diameter of the resistance layer of the main flow) and a 70 mm effective height of the resistance layer of the main flow and a 90 mm effective height of the resistance layer of the dosing flow, the diameter of the dosing pipe can be estimated using the following relationships.

$$A_{DR} = V_D \frac{A_{HS}}{H_{HS}} H_{DR}$$

With $A_{HS}$=5026 mm², $V_D$=0.001, $H_{HS}$=70 mm, $H_{DR}$=90 mm

Gives $A_{DR}$=6.5 mm²

And hence an internal diameter of the dosing pipe of around 3 mm.

If concentrated salt solution flows through the dosing pipe, the resistance of the dosing pipe also has to be adapted to the dynamic viscosity of the concentrated salt solution compared to the dynamic viscosity of water.

Consideration also has to be given for highly concentrated salt solutions having a salt content of greater than 250 g/l. For example, a concentrated $CaCl_2$) solution having up to 740 g/l salt has a significantly higher dynamic viscosity than pure water. The dynamic viscosity of the salt concentrate can be higher by about a factor of 4 compared to water. Accordingly, the dosing cross section has to be enlarged by a factor of 4 in order to compensate for the elevated dynamic viscosity and to achieve the desired dosing ratio.

This effect is advantageous for uniform dosing over the lifetime of the cartridge since the salt solution in the salt chamber is increasingly diluted by the inflowing untreated water towards the end of the cartridge lifetime. As the salt concentrate is diluted, its viscosity also decreases and the dosing amount increases. Overall, however, as a result of the mutual interaction of dilution effect/decreasing viscosity/higher addition rate, the added salt amount remains, at least considered in approximate terms, about the same until its final depletion phase.

$$\frac{A_{DR}}{H_{DR}} \eta s \bigg/ \frac{A_{HS}}{H_{HS}} \eta w = V_D$$

For the determination of the dosing amount—equation above by the dynamic viscosity of water: $\eta w$ and $\eta s$—dynamic viscosity of the salt solution.

The resistance section can also be formed by a capillary instead of a dosing pipe filled with granular material. If, for the resistance section of the main flow, a granular material with a particle size of 0.1 to around 1 mm is used, it has been found that the internal diameter of the capillary for forming the resistance section for dosing the salt solution should be in the range from 0.1 mm to 0.5 mm, in particular between 0.15 to 0.4 mm.

It is important to mention that, in particular in the dosing flow, further points of resistance may still occur. An example of these are air bubbles which have to be pressed through grille structures or nonwovens. The dosing amount is thus reduced until the conduits for the dosing flow are free of air bubbles. Therefore, the resistance layer of the main flow in the event of the envisaged minimum throughput of the filter must generate as much differential pressure as the height of the dosing chamber including the dosing pipe generates hydrostatic pressure in the case of the medium water. Practice has also shown that, due to the additional points of resistance, a diameter of the dosing pipe which is around 1 mm larger than theoretically required is required in order to achieve the target dosing ratio. With the above-described apparatus, a largely throughflow-independent dosing ratio between untreated water and brine can be achieved continuously. In the above example, this is between 0.5 l/min to around 3 l/min.

However, in practical use of this method, it has been found that in particular after relatively long operational downtimes (stagnation), a marked overdosing of the brine can occur when withdrawing the first 0.5 to 1 l of mineralized water.

This is in particular due to the fact that minor air inclusions are always present in the brine vessel and furthermore pressure fluctuations can arise in the housing of the mineralization cartridge via for example the water line, these generating extremely small flows of non-mineralized water into the brine vessel via the dosing exit into the vessel and during depressurization also of brine into the filter. If these fluctuations arise frequently, this amounts to an operation of pumping brine into the pressure vessel.

As a result, for example, the first half liter after an overnight downtime does not have the desired 600 μS/cm but instead for example 2000 μS/cm. According to a further preferred embodiment, therefore, a storage vessel is interposed as a temporary brine store between the brine vessel exit point from the dosing chamber and the brine dosing point.

The brine solution can thus be temporarily stored in a temporary brine store between its exit point from the at least one storage vessel or dosing chamber and the brine dosing point into the main flow of the water, which temporary brine store is preferably made from a flexible material and in particular is arranged substantially horizontally in the operational position of the water filter cartridge. The horizontal orientation relates to the operational position of the treatment device, such as for example a filter cartridge which is connectable to a conduit-connected filter head.

This vessel or temporary brine store may for example be a flexible hose with a length of around 150 mm and an internal diameter of around 1 mm. In the event of pressure fluctuations in the surrounding environment the brine is therefore merely shifted back and forth, but no fresh brine exits from the brine vessel.

Preferably, the temporary brine store can be a hose with a filling volume of 0.05 ml to 0.3 ml.

Particularly preferably, the temporary brine store used can be a hose with a length of 5 cm to 30 cm and in particular a diameter of 0.5 mm to 3 mm.

Since the water filter cartridge can be operated at a pressure of from 0.2 bar to 8.0 bar, it can be connected without problems to all common water supply lines.

Formula for determining the cylindrical equivalent diameter when using a conical pipe with d1 (feed) and d2 (discharge):

d1—large diameter
d2—small diameter
dR—equivalent diameter of a cylindrical pipe $$dR = \sqrt{\frac{1}{\left(\frac{1}{d1d2 - d2^2} - \frac{1}{d1^2 - d1d2}\right)}}$$

According to a second aspect, a conduit-connected water filter cartridge, comprising a housing in the form of a pressure vessel, an inlet and an outlet for water. This conduit-connected water filter cartridge is characterized in that
provided inside the pressure vessel are a main conduit for conducting a main flow of water, to which minerals are intended to be added, and a dosing conduit for conducting a dosing flow of concentrated salt solution, wherein the dosing conduit branches off from the main conduit and comprises a storage vessel of constant volume which contains a salt solution formed of sulfate salt, chloride salt and/or hydrogencarbonate salt, wherein the part of the dosing conduit departing from the storage vessel is connected to the main flow at a dosing point via a dosing opening having a constant flow cross section, and wherein a resistance section is arranged in the main conduit upstream of the dosing point and preferably wholly or partly downstream of the branch of the dosing conduit in the direction of flow, the flow resistance of which is set such that a differential pressure arises between the main flow and the dosing flow, this differential pressure bringing about a volume flow of the dosing flow of the salt solution, through the dosing opening that opens into the main flow, which is substantially proportional to the main flow.

The conduit-connected water filter cartridge can comprise a dosing section or a dosing flow with a resistance section in the form of a bed of a granular material and/or of a capillary and/or of an otherwise porously permeable resistance component, for example comprise a resistance component formed from sintered granular material, which preferably have an internal diameter in a range from 0.1 to 0.5 mm, in particular between 0.17 and 0.35 mm.

More preferably, the storage vessel can contain a salt bed formed of sulfate salt, chloride salt and/or hydrogencarbonate salt and hence a storage volume of concentrated salt solution can be present downstream of the salt bed in the direction of flow.

By means of such a device, mineralization of practically mineral-free water (for example from reverse osmosis systems) or water with a normal mineralization level, such as piped water, can be made possible by addition of desired minerals, for example magnesium, in an easy-to-handle manner.

The conduit-connected water filter cartridge can comprise a dosing section or the dosing flow with a resistance section in the form of a bed of a granular material and/or of a capillary, which preferably have an internal diameter in a range from 0.1 to 0.5 mm, in particular between 0.17 and 0.35 mm.

Preferably, a temporary brine store is provided between the brine exit point from the at least one storage vessel, which is also referred to as outlet, and the brine dosing point, which temporary store is arranged preferably substantially horizontally in the operational position of the conduit-connected water filter cartridge.

The technical effect of this is that an increase in the concentration levels of the water located in the main flow of the filter cartridge during times of stagnation can be prevented. In particular in the event of repeated pressure changes in the line system and/or when degassing air inclusions.

This is because, although the temporary brine store allows the brine located within it to oscillate back and forth during pressure fluctuations, the concentration of the brine stored in the exit region of the temporary store—which can also be referred to as dosing point—cannot be increased again after a dilution effect brought about by the entry of water from the main flow. This is because an appropriate proximity to the salt store would be needed for this in order to dissolve further salt. Yet it is precisely this which is prevented by means of the interposed brine store and the brine located within it as a barrier.

The temporary brine store can be a hose which preferably has a filling volume of 0.05 ml to 0.3 ml. The design as a hose has the advantage that the temporary brine store can be designed for example as a spiral arranged lying in one plane in the filter cartridge.

As a result, essentially no pressure and hence no additional resistance has to be overcome for dispensing brine from the temporary brine store. The technical effect associated with this is that control of the brine dispensing after the run-in period of the filter cartridge remains substantially unaffected by this temporary brine store.

It has been found to be particularly advantageous when the hose is 5 cm to 30 cm long and has a diameter of 0.5 to 3 mm.

Particularly simple control of the dosing can be realized when the resistance layer of the dosing flow and the resistance layer of the main flow, which can also be referred to as filtrate flow, are composed of the same granular material. This is because both resistance layers then have the same specific resistance and the resistance ratio of the flow sections can be set via the cross section and length of the flow sections.

EXEMPLARY EMBODIMENTS

Exemplary embodiments are described in more detail below with reference to the appended figures.

In the figures:

FIG. 1: schematically shows by way of example a water filter cartridge in plan view marked with a longitudinal section A-A and a horizontal section/cross section B-B.

Figure 2:
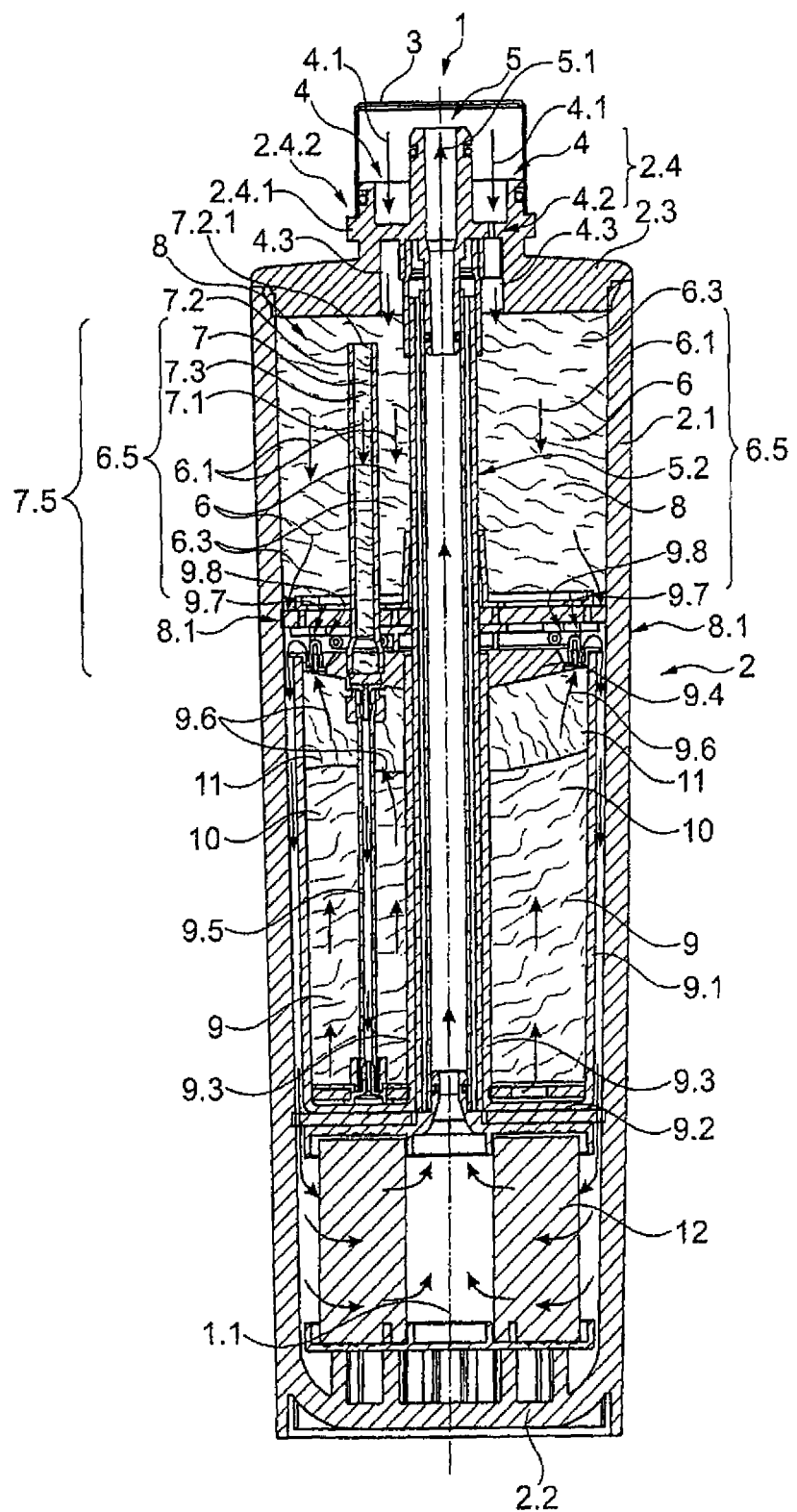

FIG. 2: schematically shows by way of example an illustration of a section through a water filter cartridge, along longitudinal section A-A according to FIG. 1, in a first embodiment.

Figure 3:
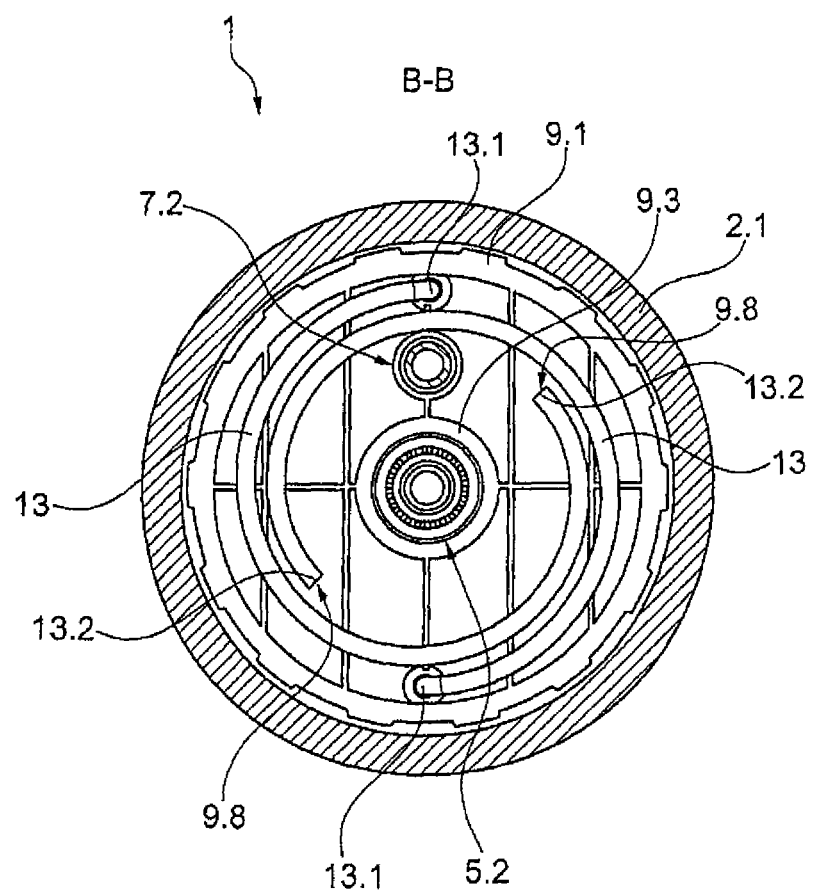

FIG. 3: schematically shows by way of example an illustration of a section through the water filter cartridge according to FIG. 1 in the first embodiment, along horizontal section/cross section B-B.

Figure 4:
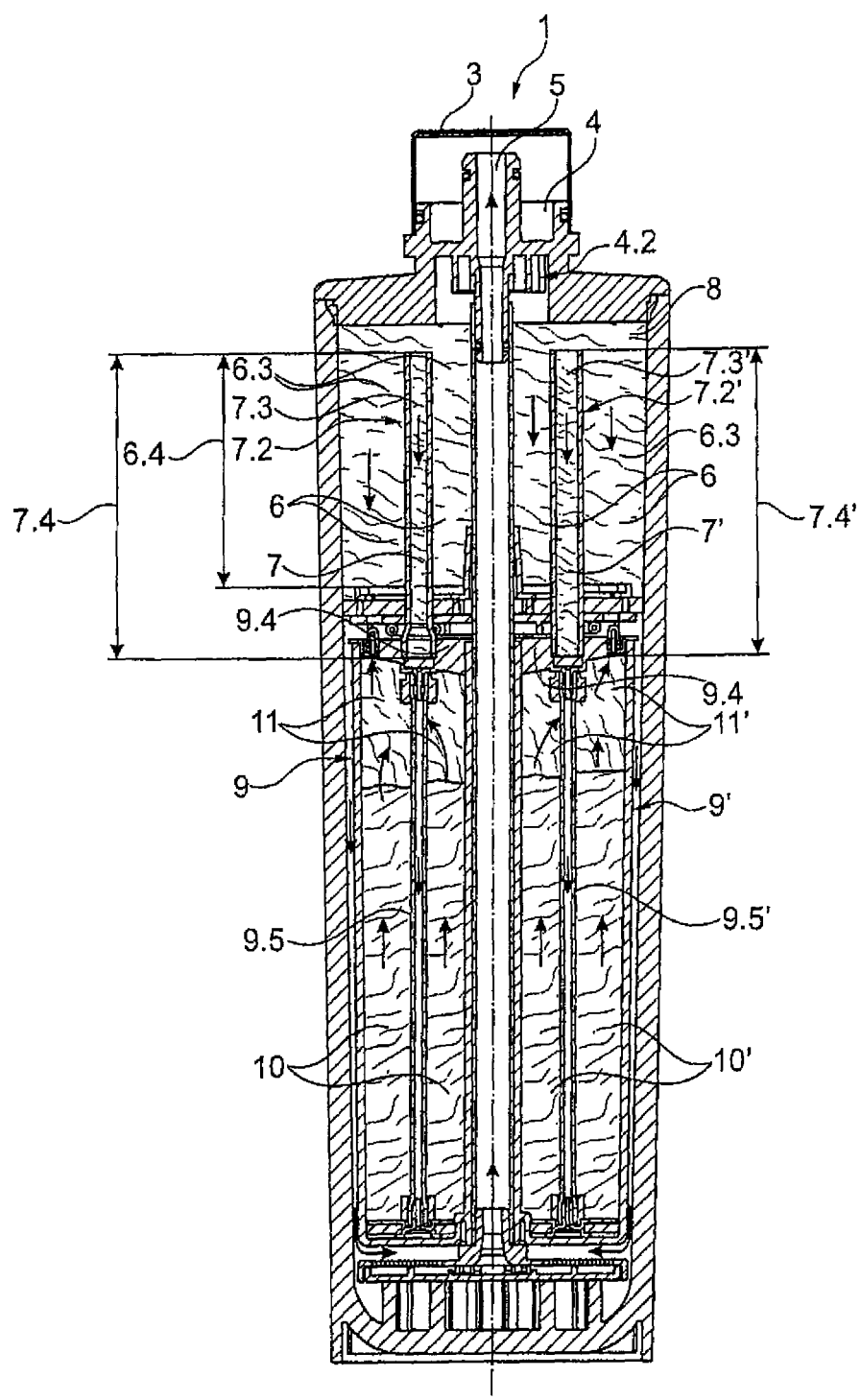
Figure 5:
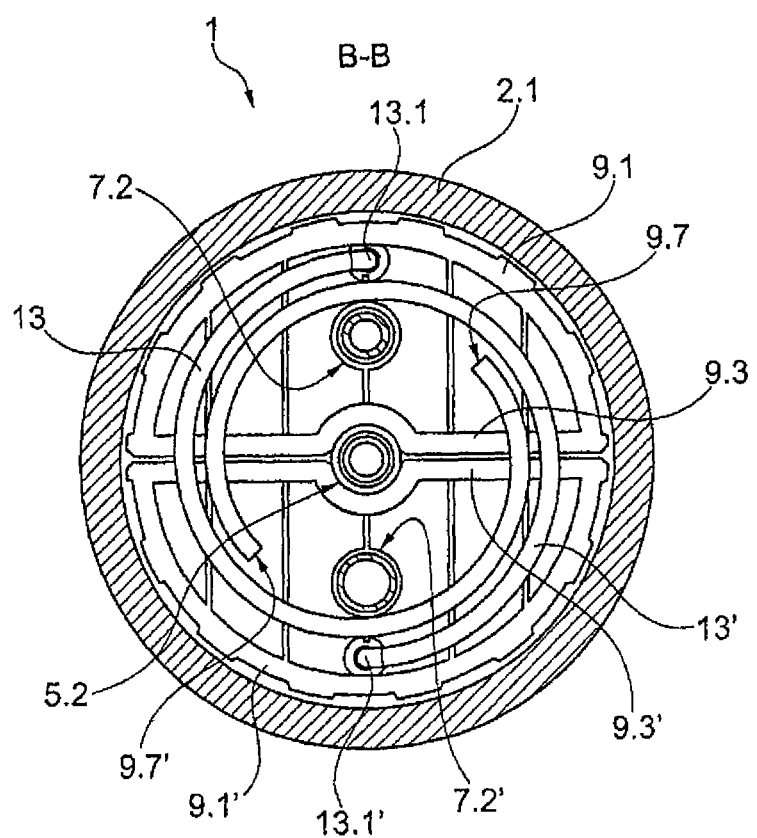

FIGS. 4 and 5: schematically show by way of example two illustrations of sections through the water filter cartridge according to FIG. 1 in a second embodiment, along longitudinal section A-A and along horizontal section/cross section B-B, respectively.

Figure 6:
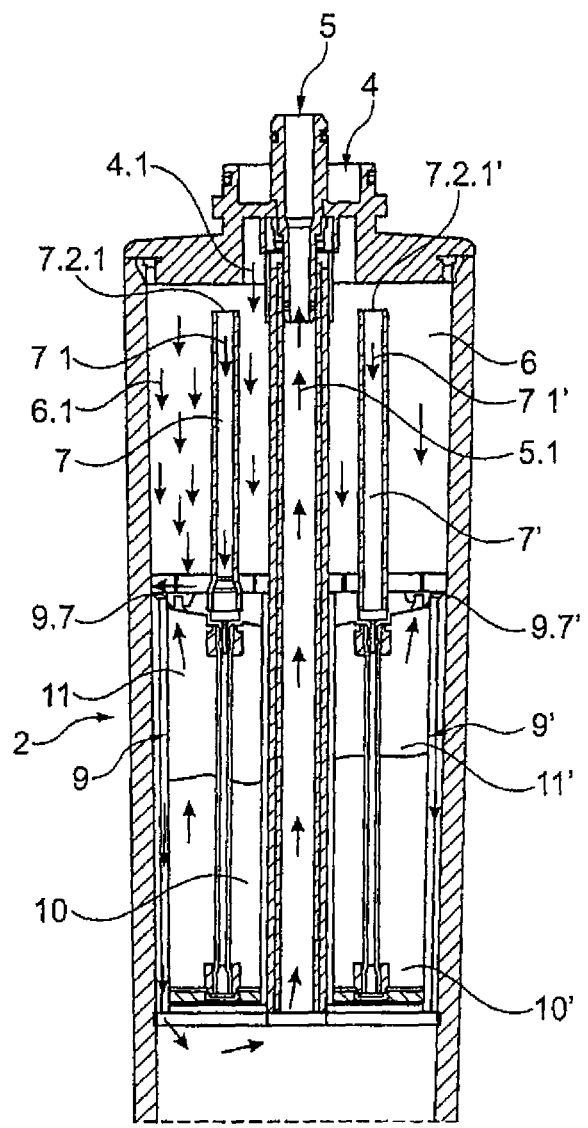
Figure 7:
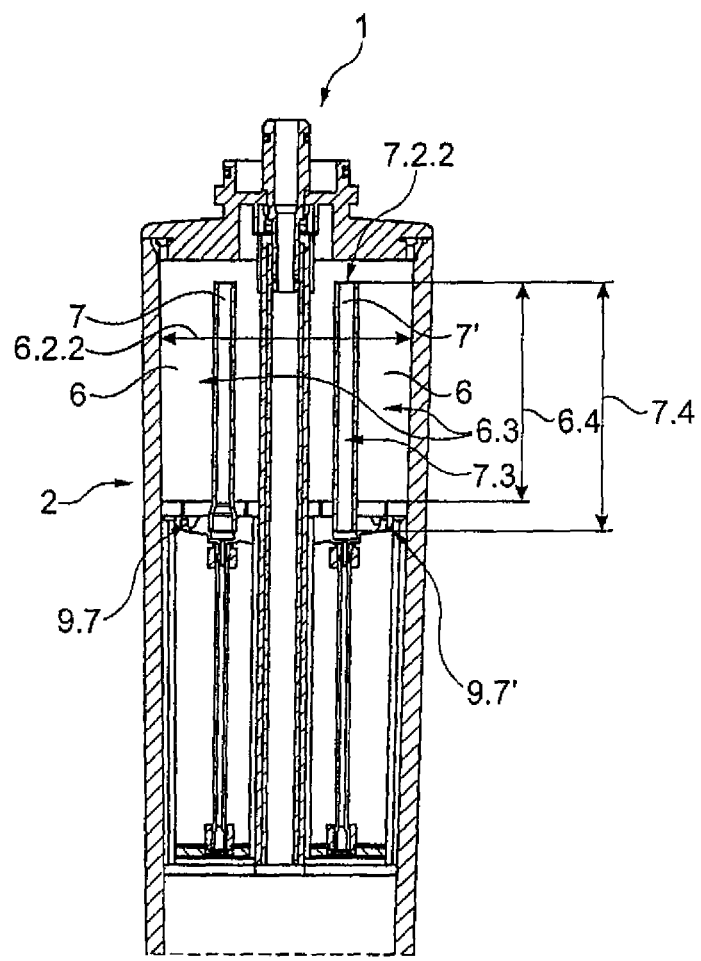
Figure 8:
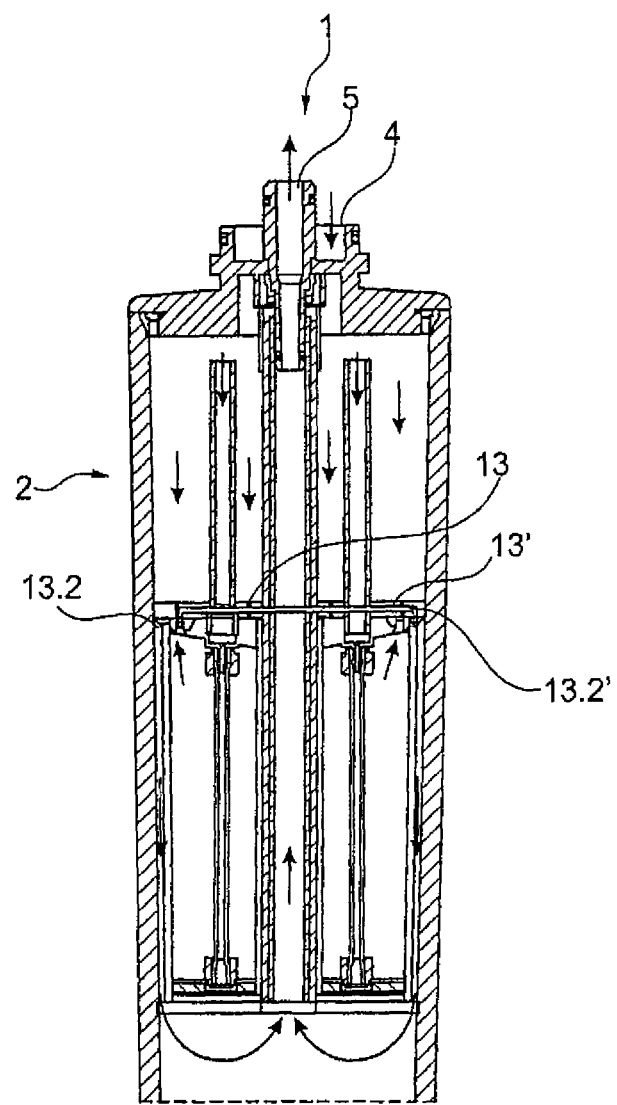

FIGS. 6 to 8: schematically show by way of example further details concerning the construction of the water filter cartridges.

Figure 9:
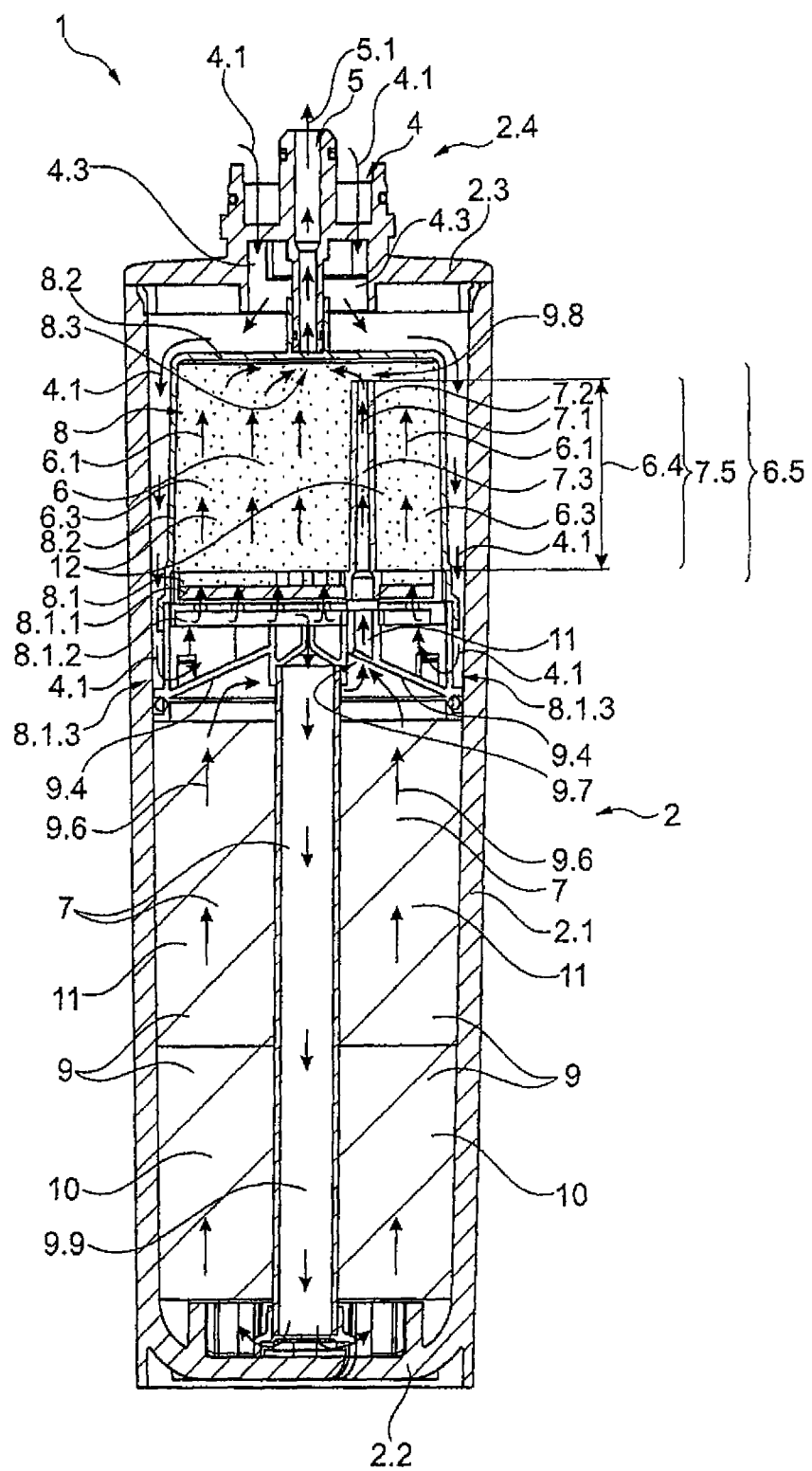
Figure 10:
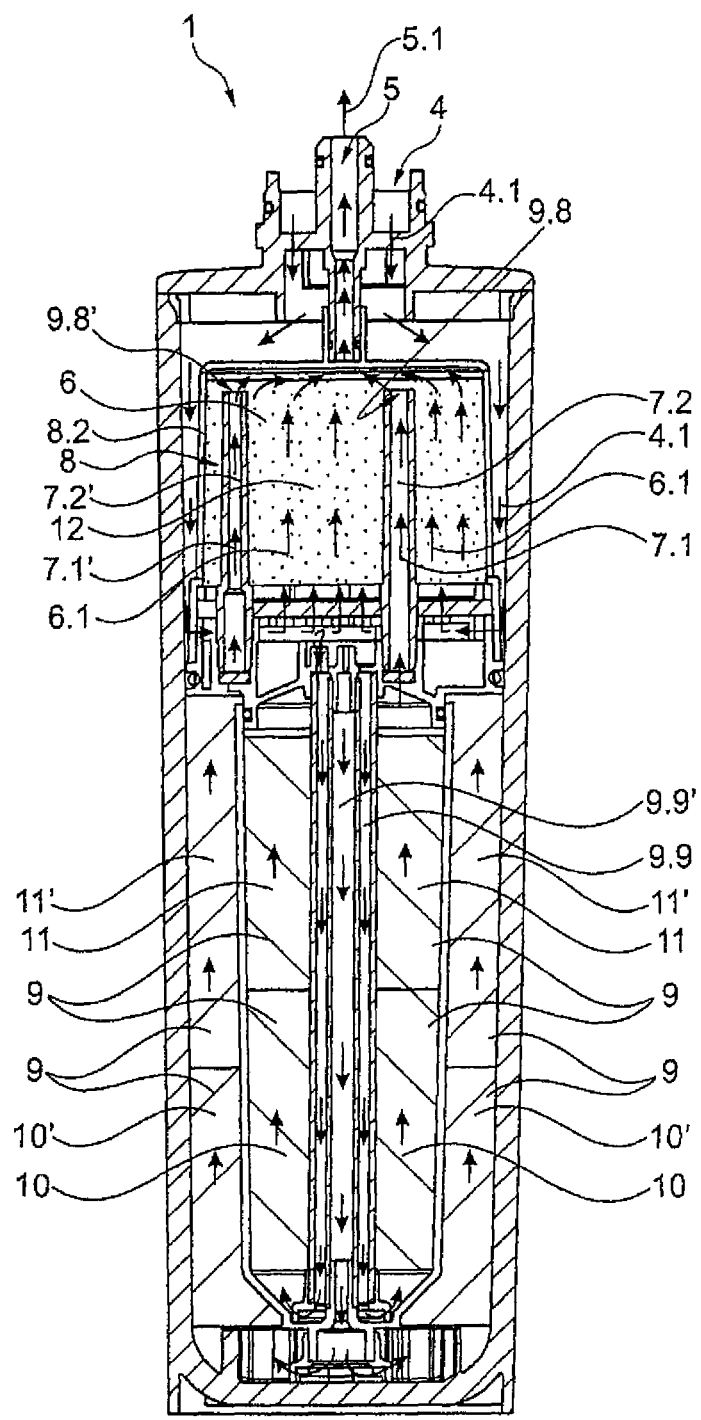

FIGS. 9 and 10: in turn schematically show by way of example two further embodiments with an internal construction which differs from the designs operating in pressure mode in FIGS. 2 to 8 in that they function in accordance with the suction principle.

Accordingly, FIG. 1 shows the illustration of a conduit-connected water filter cartridge 1 having a housing 2, comprising a wall 2.1, a base 2.2, a cover 2.3 and a neck 2.4.

Three fastening elements 2.4.1 are shown at the neck 2.4, for example arranged distributed around this neck. Using these fastening elements, the filter cartridge 1 can be fastened in a complementary conduit-connected connection head (not shown), after it has been inserted in said connection head, and thereafter brought into operation.

A protective cap 3 covers and closes in FIG. 1 in a detachable manner the connection region of the filter cartridge (cf. FIG. 2).

Along the longitudinal axis 1.1 which runs through the housing of the filter cartridge there are shown a vertically running sectional line A-A and, transversely thereto and approximately in the upper third of the housing, a horizontally running sectional line B-B. These are relevant for the subsequent figures.

FIG. 2 shows an illustration of a section through the filter cartridge 1 along sectional line A-A from FIG. 1. In this are illustrated in the sectional state: housing 2, wall 2.1, base 2.2, and cover 2.3 placed on the end face opposite the base and having an adjoining neck 2.4.

In this neck 2.4 an outlet 5 protruding in the manner of a pipe is formed centrally on the inside for the exit of the water to be treated by the filter cartridge. An inlet 4 into the cylindrical-conical filter cartridge 1 for the water to be treated surrounds this outlet coaxially and is delimited by the outer wall 2.4.2 of the neck 2.4. Arrows 4.1 and 5.1 symbolize the flow direction of the water to be treated.

A detachable protective cap 3 protects these inlet and outlet regions 4, 5 of the filter cartridge 1, in particular against contamination and/or damage, for example of the connection and/or sealing structures.

A passage 4.2 lying in the sectional plane A-A for the water is shown between inlet 4 and the interior of the cartridge 1 in the right-hand half of the cover 2.3. This passage is one of preferably two or more passages formed in the cover 2.3 around the outlet 5. These open out in a preferably circumferential recess 4.3, formed within the cover 2.3 and extending towards the neck, so that the inflowing water to be treated can be divided inside the water filter cartridge in the upper region thereof and can flow uniformly to the relevant flow sections or flow paths which are located downstream in the filter cartridge.

In this exemplary embodiment, these flow sections or flow paths are a main flow path 6 and a dosing flow path 7. Here, too, arrows 6.1 and 7.1 symbolize the flow direction of the water or of the relevant flow path.

The main flow path 6 extends in the upper quarter, referred to as granular material chamber 8, of the embodiment of a filter cartridge 1 shown here, in cross section over the entire area of the interior of the filter cartridge, except for the conduits arranged therein, the dosing pipe 7.2 for the dosing flow path 7 and the outlet pipe 5.2 for the outlet flow path 5.

The granular material chamber 8 is delimited downstream by a granular material chamber base 8.1. This granular material chamber base can comprise a nonwoven, a grille and/or the like. It retains granular material disposed in the granular material chamber 8.

The granular material functions in each of the two flow paths 6 and 7 as a resistance layer for water flowing through and is shown as an accumulation of granular material 6.3 in the main flow path 6 and of granular material 7.3 in the dosing flow path 7. The granular material/the resistance layer forms the resistance section 6.5 in the main flow 6 and the resistance section 7.5 in the dosing flow 7. Preferably, this is in each case the same granular material, which accordingly also has the same specific flow resistance and hence brings about the same differential pressure per cm in the direction of flow. This facilitates setting of a dosing ratio between the main flow 6 and the dosing flow 7 based on this differential pressure (see explanation in the general description part).

The water in this case flows from top to bottom through the granular material, i.e. the resistance section 6.5 of the main flow path 6 and the resistance section 7.5 of the dosing flow path 7.

A dosing chamber 9 in the form of a salt and brine vessel 9 is arranged downstream and below the granular material chamber 8 in the illustration in FIG. 2. This comprises an outer dosing chamber wall 9.1, a dosing chamber base 9.2, an inner dosing chamber wall 9.3 and a cover 9.4.

The dosing chamber 9 is designed as a hollow cylinder with an axial recess for the outlet pipe 5.2. It thus extends all around and on the left and right of the cartridge longitudinal axis 1.1 in the illustration in FIG. 2, the left and right side being joined to one another.

The dosing pipe 7.2 penetrates the granular material chamber base 8.1 and joins the granular material chamber 8 to the dosing chamber 9 through the dosing chamber cover 9.4.

Following the dosing pipe 7.2, a dosing conduit 9.5 leads in the direction of flow 7.1 from the dosing chamber cover 9.4 to the dosing chamber base 9.2 in order to allow the water flowing during operation of the filter cartridge 1 via the dosing section 7 to flow out from the dosing chamber 9 in the vicinity of the base.

The dosing chamber 9, which functions as a brine vessel 9 and which is also referred to as a storage vessel 9, contains salt 10. This salt is dissolved by water flowing through the filter cartridge during operation to form brine 11. The brine is then present as a concentrated salt solution 11 above the salt 10 in the dosing chamber 9 up to the lower side of the dosing chamber cover 9.4.

For the purposes of improved flow guidance in the dosing chamber 9 (cf. arrows 9.6) and in particular for removing the air therefrom, the dosing chamber cover 9.4 has an oblique design on its underside when viewed in cross section in the operational position of the filter cartridge, as shown in FIG. 2. The oblique cover of the dosing chamber 9 brings about easier migration of air bubbles, especially small air bubbles, towards the exit 9.7 of the dosing chamber.

This exit 9.7 is designed in the higher region of the dosing chamber 9 in the form of a passage out of the dosing chamber 9. In this embodiment, two exits are shown by way of example, one on the left and one on the right in the figure.

In a first embodiment, the exit 9.7 can function as a dosing point 9.8 for the concentrated salt solution 11 into the main flow 6. The brine mixes with the main flow 6 and flows along with it between the wall 2.1 of the housing 2 and the outer wall 9.1 of the dosing chamber, downwards in the illustration of FIG. 2 towards the outlet pipe 5.2 and onwards towards the outlet 5.

In order to ensure that the water treated by the filter cartridge 1 leaves the latter germ-free, it can be passed through an appropriate filter 12, for example an activated carbon filter. Such a filter is for example shown beneath the dosing chamber 9 in FIG. 2 as a further hollow cylindrical body. The centrally inner recess thereof opens into the outlet pipe 5.2.

According to a second, preferred embodiment, the exit 9.7 of the dosing chamber 9 can in contrast be connected to a further storage vessel 13 or temporary brine store 13 acting as a buffer. This temporary brine store 13 can for example be designed in the form of a hose, as illustrated in FIG. 3. This shows the illustration in the sectional plane B-B of FIG. 1, based on the embodiment according to FIG. 2, transversely through the filter cartridge 1 and rotated clockwise by 90 degrees.

The dosing points 9.8 for the brine 11 into the main flow 6 are in this case each exit 13.2 of each storage vessel 13 or temporary brine store 13 designed as a hose. This hose 13 lies in the form of a spiral in or on the sectional plane B-B.

The connection 13.1 of the hose 13 passes through the granular material chamber base 8.1 into the dosing chamber 9, preferably at an angle.

This storage vessel 13 has the effect that in the event of stagnation, when the filter cartridge thus has no water passing through it, unintended pump processes cannot cause any over-concentration in the mineralization process, for example due to pressure fluctuations/pressure surges and/or escape of e.g. air in the system (see explanations above). Otherwise, identical references denote the same features as in the other figures.

FIG. 4 shows a further exemplary embodiment of a filter cartridge 1. Identical references here also denote the same features as in the preceding figures.

In contrast to FIG. 2, two dosing chambers are present in this design, a left one 9 and a right one 9', each with an associated dosing pipe 7.2 and 7.2', respectively. Each dosing chamber 9, 9' can be filled with the same or, as shown by way of example, a different salt 10 or 10' from the respective other dosing chamber 9', 9. Accordingly, two identical, or, as shown here, two different brines 11 and 11' are also formed.

The functional principle for the addition of minerals, that is to say of the respective brine 11 or 11', into the main flow 6 can be realized as in the examples of FIGS. 2 and/or 3.

Here too, granular material layers are arranged in each case in the granular material chamber 8 and in the dosing pipes 7.2, 7.2', these preferably being composed of the same granular material in order to establish the same resistance value per unit of distance.

The effective height 6.4 of the resistance/granular material layer 6.3 in the main flow 6 extends from the height of the inlet of the dosing pipe 7.3, 7.3' to the granular material chamber base 8.1.

The effective height 7.4, 7.4' of the resistance/granular material layer 7.3, 7.3' in the respective dosing flow 7, 7' likewise extends from the height of the inlet of the dosing pipe 7.3, 7.3' concerned to the end of same, which in this case is located in the dosing chamber base 9.4.

The right-hand dosing pipe 7.2' is by way of example dimensioned differently from the left-hand one. For example, a different dosing ratio between the left and right dosing flow could thus be brought about. For example for sulfate salt 10 on the left and for hydrogencarbonate salt 10' on the right.

FIG. 5 shows, similar to FIG. 3, the illustration of a filter cartridge 1 in the sectional plane B-B of FIG. 1, but based on the embodiment according to FIG. 4, transversely through the filter cartridge 1 and rotated clockwise by 90 degrees.

In the lower half of the illustration here, the right-hand half of FIG. 4 is shown in plan view. The upper half here shows the left-hand half of FIG. 4. Here, too, identical references denote the same features as in the preceding figures, in particular as in FIG. 4.

FIGS. 6 to 8 show supplementary illustrations for better comprehension.

For instance, FIG. 6 likewise shows a longitudinal section through a filter cartridge 1 with housing 2. Here, too, identical item numbers denote the same features as in the other figures. Thus, for example, 6 denotes the main flow path, 7 and 7' the dosing flow paths, 6.1, 7.1, 7.1' the arrows for the directions of flow concerned. Items 9.7 and 9.7' denote the two exits from the two dosing chambers 9, 9' as dosing points for the addition of the brine into the main flow path 6, which can also be referred to as mixing point, and 10, 10' the respective salt and 11, 11' the associated brine or the brine supernatant. The inlet or feed into the dosing section is denoted with 7.2.1 and 7.2.1'.

Correspondingly, FIG. 7 shows, similarly to FIG. 4, the filter cartridge 1 with housing 2, main flow 6, dosing flow 7 and 7' with effective height 6.4 of the resistance layer for the main flow 6 and effective height 7.4 for the dosing flow 7, 7' and the respective cross-sectional area 6.2.2 for the main flow and 7.2.2 for the dosing flow. The granular material in the main flow is denoted with 6.3 and in the dosing flow with 7.3.

The brine dosing points are accordingly realized at the exits denoted with 9.7 and 9.7' for a design with direct addition of brine from the brine chamber 9, in contrast to the designs according to FIGS. 3 and 5. That is to say, without a storage vessel 13 or temporary brine store 13.

FIG. 8 likewise shows a filter cartridge 1 with housing 2 in sectional illustration. This differs from the illustration in FIG. 7 essentially in that here a respective storage vessel 13 or temporary brine store 13 for the concentrated salt solution is provided in the form of a hose 13, corresponding to the embodiments according to FIGS. 3 and 5. The respective dosing point 9.8 concerned is here realized by the exit 13.2 or 13.2' of the hose 13 or 13'.

FIGS. 9 and 10 schematically show by way of example two further embodiments with an internal structure which, compared to the designs operating in pressure mode according to FIGS. 2 to 8, is modified to the extent that in these embodiments the water flows from bottom to top through the granular material layer, that is to say the resistance section 6.5 of the main flow path 6 and the resistance section 7.5 of the dosing flow path 7. They thus function based on the suction principle. Identical numbers each have the same meaning as in the previously described embodiments.

In detail, FIG. 9 shows a conduit-connected water filter cartridge 1 with a housing 2, comprising a wall 2.1, a base 2.2, a cover 2.3 and a neck 2.4.

Here, too, a bed of granular material 6.3 forms a resistance section 6.5 which, however, is arranged below/in a granular material chamber bell-shaped cover 8.3 such that, with the filter cartridge 1 in the operational orientation, with the outlet 5 directed upwards, the water flowing in according to the arrows 4.1 flows through it from bottom to top. This design operates on the basis of a suction principle.

The water 4.1 to be treated passes via inlets 8.1.3 in the dosing chamber base 8.1 into a distribution chamber 8.1.2 and from there, via a nonwoven and/or a grille 8.1.1 for retaining particles, into the granular material layer 6.3.

Only a small portion of the water 4.1 to be treated flows via the dosing flow 7. First downwards through a feed pipe 9.9 from the lower end of which it passes into the dosing chamber 9 storing the salt 10 and, by dissolving the salt 10, forms the brine 11 to be added to the main flow 6.

This brine 11 rises, according to the flow volume through the filter cartridge 1 and the dosing ratio between main and dosing flow, further upwards in the dosing chamber up to the cover thereof of dome-like design, and at the highest point thereof is sucked into the dosing pipe 7.2, which is arranged structurally above but formed functionally downstream of the dosing chamber 9, up to the brine dosing point 9.8.

The granular material 6.3 and 7.3 can in this design be a filter stage in the form of a bed of carbon, in particular activated carbon. In principle, however, other granular materials are also suitable for forming such a resistance section 6.5 and 7.5.

Air is removed from this filter cartridge substantially better and more rapidly compared to the embodiment in which the water flows through the granular material/resistance layer from the top. In particular when starting up, the air located in the salt vessel 9 between the salt grains can escape very rapidly through the dosing pipe 7.2 since the resistance of the dosing pipe for air is low compared to the resistance for water.

The brine solution 11 is dosed directly from the resistance pipe 7.2 of the dosing section 7 into the main flow 6 of the water to be treated.

Pressure fluctuations in the feed lead to movements in the amply dimensioned feed pipe 9.9 for the water, which yet becomes brine on flowing through the vessel.

The brine dosing itself remains virtually constant as a result of the suction principle, even in the event of external pressure fluctuations. In the event of pressure fluctuations in the feed, as arise during the depressurization of the whole filter 1, for example when the water pressure upstream of the filter drops from 2 bar to 1 bar when a tap is opened and the bubbles expand, the enclosed air bubbles in the salt vessel 9 expand. These air bubbles displace only little saturated brine towards the outlet via the dosing pipe which is filled with granular material and through which flow is difficult, whereas in contrast most brine flows back into the large downpipe and does not cause any increase in the salt load in the mineralized water.

FIG. 10 shows a similar embodiment as FIG. 9, but with two brine dosing devices, as an example for a plurality of possible.

The modes of operation are the same, and therefore identical item numbers also have the same meaning as set out with respect to FIG. 9. Thus, for reasons of simplification, reference is made in principle to the above explanations with respect to FIG. 9.

Hereinafter, only the items concerning the additionally illustrated elements of the second dosing device are accordingly described. The numbers of the elements concerned of the second brine dosing device are supplemented with "'" in this case.

This design comprises two dosing chambers 9, 9' which each contain salt 10, 10' and brine 11, 11'. These brines are added into the main flow 6 of the water to be treated via the two dosing pipes 7.2, 7.2' at the respective brine dosing points 9.8, 9.8'. The salts are preferably different in order for example to be able to add two different minerals. The dosing ratios may also be different, for example depending on the respective desired amounts of the particular salt that are to be added.

LIST OF REFERENCES

1 Filter cartridge
1.1 Cartridge longitudinal axis
2 Housing
2.1 Wall
2.2 Base
2.3 Cover
2.4 Neck
2.4.1 Fastening elements
2.4.2 Outer wall
3 Protective cap
4 Inlet
4.1 Arrow
4.2 Passage
4.3 Recess
5 Outlet
5.1 Arrow
5.2 Outlet pipe
6 Main flow path
6.1 Arrow
6.2.2 Cross-sectional area of main flow
6.3 Granular material
6.4 Effective height of the resistance/granular material layer
6.5 Resistance section
7 Dosing flow path
7.1 Arrow
7.2 Dosing pipe
7.2.1 Feed/inlet into the dosing pipe
7.2.2 Cross-sectional area of the dosing flow
7.3 Granular material
7.4 Effective height of the resistance/granular material layer
7.5 Resistance section
8 Granular material chamber
8.1.1 Nonwoven and/or grille
8.1 Granular material chamber base
8.2 Granular material chamber bell-shaped cover
8.3 Retaining means
9 Dosing chamber (also referred to as brine or storage vessel)
9.1 Dosing chamber wall
9.2 Dosing chamber base
9.3 Dosing chamber wall
9.4 Dosing chamber cover
9.5 Dosing conduit
9.6 Arrow
9.7 Exit
9.8 Dosing point for salt solution
9.9 Feed pipe
10 Salt
11 Brine
12 Filter
13 Storage vessel
13.1 Connection
13.2 Exit

The invention claimed is:

1. A method for operating a conduit-connected water filter cartridge having a differential pressure vessel housing with an inlet and an outlet for water, wherein the improvement comprises:
(a) conducting a main flow of water through a main conduit;
(b) providing a dosing flow through a dosing conduit wherein the dosing conduit branches off from the main conduit
and leads to a constant volume dosing vessel which contains a salt selected from the group comprising a sulfate salt, a chloride salt and/or a hydrogencarbonate salt and, wherein an exit of the dosing conduit departs from the constant volume dosing vessel into the main flow at a dosing point via a dosing opening having a constant flow cross section,
(c) and wherein a first flow resistance in the main flow is set by a granular material forming a first resistance section in the main flow, which is arranged upstream of the dosing point in the direction of flow, and a separate second resistance section, having a resistance layer and/or a capillary, in the dosing flow, and introducing a water feed from the conduit-connected water filter cartridge to provide a differential pressure between the main flow and the dosing flow, said differential pressure provides a volume flow of the dosing flow of a salt solution, through the dosing opening that opens into the main flow, which is substantially proportional to the main flow.

2. The method as claimed in claim 1, wherein the salt in operation forms the salt solution of a sulfate salt, chloride salt and/or hydrogencarbonate salt as a concentrated salt solution formed downstream of the salt in the direction of flow.

3. The method as claimed in claim 1 wherein the resistance section is formed in a dosing section or in the dosing flow and forms a bed of a granular material and/or a capillary which has an internal diameter in a range from 0.1 to 0.5 mm, and preferably between 0.15 and 0.4 mm.

4. The method as claimed in claim 1 wherein the outlet (5) is directed upward and the main flow coming from the inlet is conducted from the top of the first resistance section so that it flows through the first resistance section from top to bottom.

5. The method as claimed in claim 1 wherein in operation the outlet is directed upward and the main flow from the inlet is conducted to an underside of the first resistance section so that it flows through the first resistance section from bottom to top.

6. The method as claimed in claim 2 wherein one concentrated salt solution of sulfate salts, chloride salts or hydrogencarbonate salts is used, with a solubility being at least 2 g/l at 20° C., preferably at least 50 g/l at 20° C., especially 740 g/l at 20° C.

7. The method as claimed in claim 2 wherein the salt solution is at least one salt solution and is dosed at a proportion by volume of 0.05% to 2% to the main flow.

8. The method as claimed in claim 1 wherein a granular material with a particle size of 0.1 mm to 2 mm provides a bed which has a minimum extent of 1 cm in the direction of flow.

9. The method as claimed in claim 8 wherein the granular material is used for the second resistance section of the dosing flow and is the same as the first resistance section of the main flow.

10. The method as claimed in claim 2 wherein the conductance of the water between the inlet and outlet is raised by at least 100 μS/cm to 2000 μS/cm, and is preferably 600 μS/cm.

11. The method as claimed in claim 1 wherein the water filter cartridge is operated at a pressure of from 0.2 bar to 8.0 bar.

12. The method as claimed in claim 2 wherein the salt solution is temporarily stored in a temporary store for the salt solution between its exit point from the at least one storage vessel and the dosing point for the salt solution into the main flow of the water, in which the temporary store for the salt solution is preferably made from a flexible material and is arranged substantially horizontally in the operational position of the water filter cartridge.

13. The method as claimed in claim 12, characterized in that the temporary store used for the salt solution is a hose with a filling volume of 0.05 ml to 0.3 ml.

14. The method as claimed in claim 12 wherein the temporary store used for the salt solution is a hose with a length of 5 cm to 30 cm and a diameter of 0.5 mm to 3 mm.

15. A water filter cartridge, for a conduit connection comprising:
(a) a differential pressure vessel housing with an inlet and an outlet for water;
(b) a main conduit for conducting a main flow of water;
(c) a dosing conduit branching off from the main conduit for conducting a dosing flow to a salt,
(d) a storage vessel of constant volume which contains the salt selected from a group comprising a sulfate salt, a chloride salt and/or a hydrogencarbonate salt, with the dosing conduit from the storage vessel connected to the main flow with a dosing point at a dosing opening having a constant flow cross section;
(e) a granular material forming a first resistance section is arranged in the main conduit upstream of the dosing point in the direction of flow; and
(f) a second resistance section in the dosing flow created by a resistance layer and/or a capillary to provide a differential pressure between the main flow and the dosing flow
and provide a substantially proportioned a volume flow of the dosing flow of the salt through the dosing point into the main flow.

16. The water filter cartridge as claimed in claim 15, wherein the storage vessel has a salt bed of the sulfate salt, the chloride salt and/or the hydrogencarbonate salt and with a storage volume of concentrated salt disposed downstream of the salt bed in the direction of flow.

17. The water filter cartridge as claimed in claim 15 wherein the second resistance section for the dosing flow is a bed of a granular material and/or a capillary which has an internal diameter in a range from 0.1 to 0.5 mm, and preferably between 0.17 and 0.35 mm.

18. The water filter cartridge as claimed in claim 15 wherein the storage vessel for the salt in operation provides a salt solution between an exit point for the salt solution from the storage vessel and the dosing point for the salt solution and is arranged preferably substantially horizontally in the operational position of the water filter cartridge.

19. The water filter cartridge as claimed in claim 18 wherein the storage vessel for the salt solution is a hose wherein said hose preferably has a filling volume of 0.05 ml to 0.3 ml.

20. The water filter cartridge as claimed in claim 18 wherein the storage vessel is the hose that is about 5 cm to 30 cm long and has a diameter of 0.5 to 3 mm.

21. The water filter cartridge as claimed in claim 18 wherein the second resistance section of the dosing flow and the first resistance section of the main flow are composed of the same granular material.

* * * * *